R. D. ELLIOTT.
PROCESS OF PRESERVING FOOD AND APPARATUS THEREFOR.
APPLICATION FILED SEPT. 24, 1912.
1,061,460.
Patented May 13, 1913.
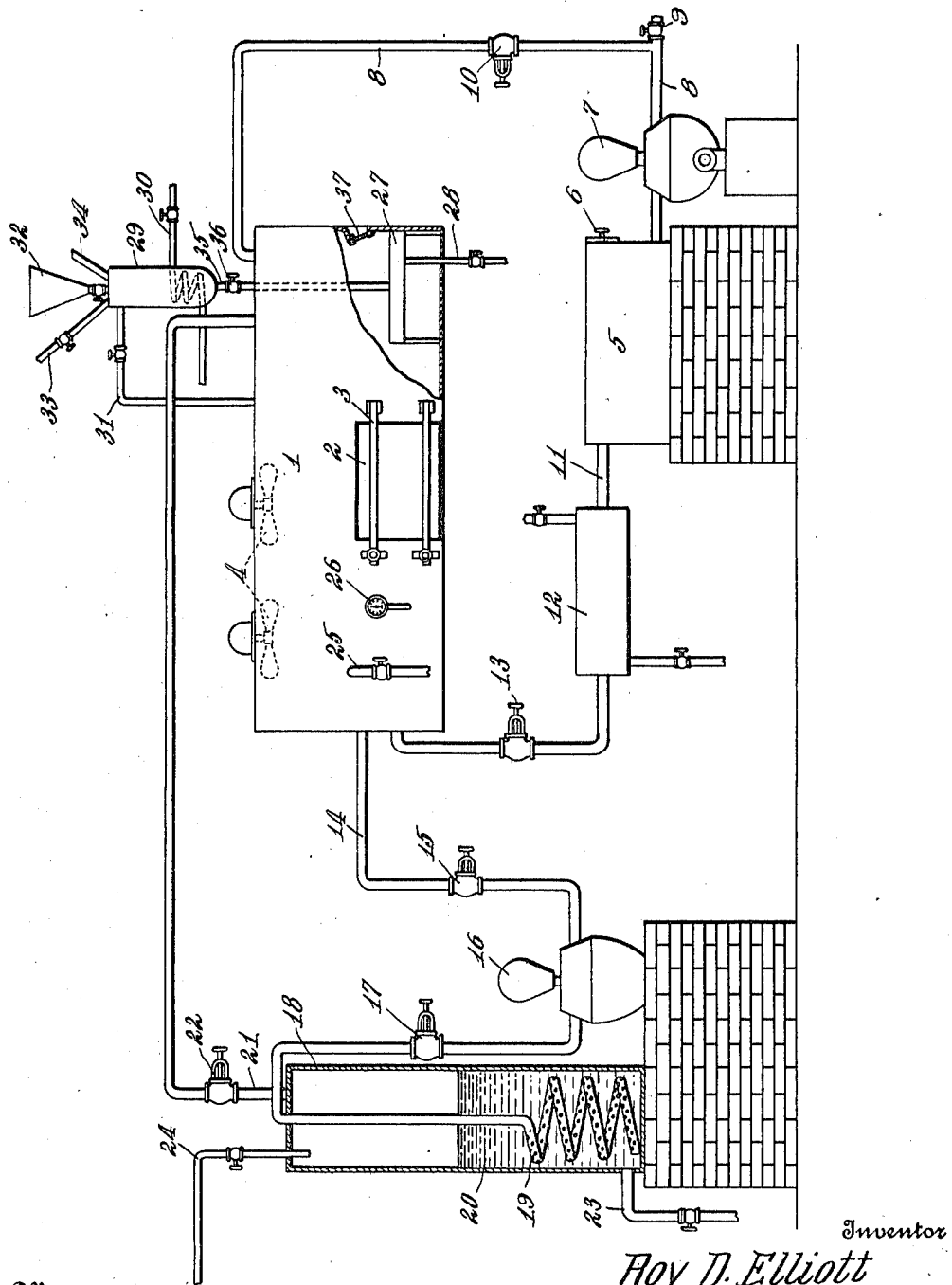

UNITED STATES PATENT OFFICE.

ROY D. ELLIOTT, OF OXNARD, CALIFORNIA.

PROCESS OF PRESERVING FOOD AND APPARATUS THEREFOR.

1,061,460. Specification of Letters Patent. Patented May 13, 1913.

Application filed September 24, 1912. Serial No. 722,053.

*To all whom it may concern:*

Be it known that I, ROY D. ELLIOTT, a citizen of the United States, residing at Oxnard, in the county of Ventura and State of California, have invented certain new and useful Improvements in Processes of Preserving Food and Apparatus Therefor, of which the following is a specification.

This invention relates to processes of preserving food and apparatus therefor; and it comprises a method of preserving food wherein such food is stored in a suitable chamber, the food and chamber are antisepticized by treatment with a volatile antiseptic, advantageously sulfur dioxid or "sulfurous acid" and advantageously used under pressure, the volatile antiseptic is then removed by absorption and storage of the food continued under aseptic conditions, the moisture content of the atmosphere of the storage chamber being suitably regulated; and it also comprises a food chamber capable of hermetic closure to withstand internal pressure, means for introducing a volatile antiseptic, advantageously means for introducing sulfur dioxid, means for removing such antiseptic from the chamber and contained food and means for adjusting the moisture content of the atmosphere within the chamber; all as more fully hereinafter set forth and as claimed.

In the preservation of food against spoiling, the main consideration is to avoid the life activity of various microorganisms, these being partly of bacterial nature and being in part organisms belonging to the higher fungi, such as yeasts. These organisms practically never occur in the interior of any fresh, unbruised or unbroken article of food; they do not occur in the interior cells. But they do occur in all dust and on all surfaces which have been exposed to air or handling; and from the food surfaces they grow and develop inwardly, causing the characteristic changes of spoiling, whether this be decay or fermentation. And the products of their life activity also penetrate inward, softening and spoiling the material by enzymic activity. In the current methods of preservation, account is taken of these facts and the effort is made to arrest life activity by maintaining the material at a temperature too low to permit it, as in refrigeration methods, by antisepticizing the food by "preservatives," such as formaldehyde, benzoic acid, salicyclic acid, salt, etc., or by sterilization by heat with subsequent preservation in sealed containers, as in canning, pasteurizing, etc. Each method has its own disadvantages. Refrigeration merely arrests bacterial and yeast activity, which at once begins anew on raising the temperature; and particularly so since the goods at once begin to "sweat," giving a good surface nidus for bacterial and yeast activity. Preservatives are objectionable as permanent components of foods; and sterilization by heat is of course impossible with many foods, such as eggs, fresh meats, etc.

It is an object of the present invention to devise a cheap, simple and ready method of preservation founded on the principle of producing an initial antisepsis of the food surfaces and of the surfaces of the chamber containing the food, removing the antiseptic and thereafter preserving the food by asepsis as long as may be desired. To this end, the food which should be as clean and fresh as possible is placed in a chamber having interior surfaces capable of ready sterilization. These surfaces should be as clean and smooth as possible. The food should be placed on racks or the like having surfaces readily antisepticized. In the case of eggs to which the present process is particularly adapted, the containing cases are advantageously made of slats about three inches wide and the fillers are specially treated and perforated. After storing the food in the chamber, the chamber is filled with an atmosphere having active antiseptic properties.

Very advantageously for the present purposes the antiseptic component may be "sulfurous acid" or sulfur dioxid. The antiseptic atmosphere is best maintained in contact with food under some pressure for a sufficient length of time to enable thorough antisepsis to take place. The next operation is to remove the volatile antiseptic. Its continued presence in the food is undesirable. Without breaking the seal of the chamber, which should be adapted for hermetic closure, the volatile antiseptic is then removed.

In the case of sulfur dioxid, this removal may be by caustic soda, potash or lime. Any base may be used. Soda and lime are the best adapted. The atmosphere of the chamber, without breaking the seal, should be vigorously circulated to and past the absorbent until no further indication of the antiseptic, such as sulfur dioxid, can be found in such atmosphere. With sulfur dioxid, at this time there will be substantially no sulfur dioxid left in the surfaces of the food material, except such as is chemically combined with such surface, as in the case of eggs where some calcium sulfite is formed in the shell. The vapor tension of sulfur dioxid is relatively high and it readily leaves moist surfaces for an atmosphere substantially free of sulfur dioxid, such as is produced by circulating the atmosphere past an active absorbent for a time. When the sulfur dioxid is all removed from the air, the circulation may be discontinued and the food thereafter preserved under aseptic conditions. The atmosphere of the chamber may be tested from time to time and should any living germs be found therein, the antisepsis and the removal of the antiseptic may be repeated. With care, such a repetition is ordinarily not necessary. Food so treated may be kept for long periods of time at ordinary temperature without spoiling or decay due to the activity of organisms. In the case of fruits however, the life activity of the tissue cells may still continue so that the preserving is not indefinite. Bananas however may be kept up to a month or so without becoming extremely ripe. No bad taste or odor develops in them. Meat, such as chicken or the like, will keep for periods above two months at temperatures varying between 19 and 25° C.; that is, summer temperatures. Eggs keep for very long periods.

In order to retain the original character of the material, another precaution is advisable, and that is of controlling the moisture content of the atmosphere within the chamber. If this atmosphere be too dry, the foods are apt to wither somewhat; and in the case of eggs, evaporation may cause the presence of a large air cell. On the other hand, if the moisture content of the atmosphere be too large, a drop in temperature may cause sweating to take place. Under aseptic conditions such as are here contemplated, a condensation does not cause decay but it is undesirable. I therefore ordinarily after completing the antisepsis and securing aseptic conditions within the chamber, control the moisture content. This may be done by circulating the chamber atmosphere through sulfuric acid, which may be of adjusted strength. By the use of strong sulfuric acid as an absorbent, any desired fraction of the moisture content of the chamber atmosphere may be removed; this being merely a matter of circulating as much of such atmosphere to, through and past the sulfuric acid as may be desired. Or weak sulfuric acid of known vapor tension may be employed; such vapor tension of course being that corresponding to the amount of moisture desired in the atmosphere of the chamber.

The chamber itself may be constructed of any desired material. An advantageous method of construction is to make a chamber, of any dimensions which may be desired, of wood or brick papered interiorly with oiled paper, cover with a coating of shellac, repaper and finally coat with waterglass varnish. This gives an interior surface of desirable character. The chamber may of course be made of any size which may be desired; and it may represent a simple "safe" for household use, may be a car or vessel hold or may be a chamber intended for general food storage purposes. The same connections for producing the antiseptic, removing it afterward, and for adjusting the moisture content of the atmosphere of the chamber may serve for a plurality of chambers.

In the accompanying illustration I have shown more or less diagrammatically one modification of apparatus within the present invention susceptible of use in carrying out the present process. In this showing, element 1 is a chamber for storing food which may be of any size or shape. There may be a plurality of similar chambers. This chamber is shown as provided with door 2 which may be hermetically closed on suitable gasket means (not shown). Cross bars 3 enable it to be locked into position. Within the chamber are shown two electric fans 4 which may be used in homogenizing the atmosphere therein. Sulfur burner 5, which may be of any suitable structure is provided with door 6. Pump 7 in conduit 8 provided with valved inlet 9 and valve 10 permits withdrawal of the atmosphere from the chamber and replacing of the oxygen therein by sulfur dioxid or sulfurous acid. The gases from the sulfur burner go through conduit 11 provided with cooling means 12 and valve 13 back to the storage chamber.

It will be seen that the means just described allow circulation of the atmosphere of the chamber in closed cycle to and through the sulfur burner. Another conduit 14 provided with valve 15 leads past pump 16 and valve 17 to a tank or absorbent chamber 18. As shown, it terminates therein in a perforated pipe 19, intended to allow the gases to discharge into intimate contact with a body of liquid 20. Any other means of securing this intimate contact, such as a tower, may be used. Conduit 21, valved at 22, leads back to the storage chamber. As will be seen, means just described allow another circulation of the atmosphere of the tank in closed cycle to and past an absorbent liquid or material and back to the storage chamber. The tank is also shown as provided with outlet means 23 for withdrawing liquid and inlet means 24 for adding liquid. The storage chamber is also provided with testing outlet 25 and pressure gage 26. It is further provided with means of testing the aseptic condition of the storage chamber. Within the chamber at one point is a pan 27 having valved outlet 28. Above the storage chamber is receptacle 29 provided with steam coil 30. A valved equalizing pipe 31 allows equalization of the storage chamber pressure with that in this receptacle. Leading into the receptacle is a valved hopper or funnel 32. Air vent 33 and pressure regulating outlet 34 allow control of pressure within this receptacle. Pipe 35, valved at 36, allows liquid to be run from the receptacle into the pan. Peep hole 37 allows inspection of the pan.

In the use of the structure as just described, the food to be preserved is stored in chamber 1 in any suitable way. As stated, eggs may be stored in slatwork crates. Sulfur is charged into the burner, kindled and the door 6 of the burner closed. The valves in the conduit leading to and from the absorbent tank being closed, pump 7 is started pumping the air out of the storage chamber and to and through the sulfur burner back to the chamber, passing the cooling jacket 12 on conduit 11. This circulation is continued until combustion in the sulfur stove ceases because of lack of oxygen. So far the pressure in the storage chamber remains the same. At this time in an advantageous manner of operating, the valve of 9 may be opened, valve 10 being closed and additional air pumped in and passed through the sulfur burner, the sulfur being rekindled if necessary. This may be continued until the gage 26 shows about 12 pounds pressure. A sample of gas taken from 25 should show at this time a fair percentage of sulfur dioxid, say 7 per cent or over. After charging the storage chamber with gas containing sulfur dioxid in the manner described, the action of pump 7 may be stopped and valves 13 and 10 closed. A circulation is then produced through receptacle 18 by means of pump 16. This is for the purpose of sterilizing the pump, the tank and the accessory conduits. During these various circulations, the electric fans 4 may be kept running in order to insure homogenization of the atmosphere within the storage chamber. They may be advantageously kept running for 8 to 12 hours after the described operations. At the end of this time, all surfaces within the storage chamber will be antisepticized.

Tank 18 may then be charged with a nearly saturated solution of sodium hydrate, strong milk of lime or the like, this absorbent being introduced through 24. A nearly saturated solution of caustic soda gives good results. The tank may be advantageously half filled with the lye. Displaced gases go back to the storage chamber through 21. Pump 16 is now started and the gases from the storage chamber are circulated through the soda or lime and back again to the chamber till a sample of chamber gases removed by 25 shows no more sulfur dioxid. The fans may be kept running during the whole time of this cyclic circulation and in any event should be started within a few hours after it begins. The chamber and its contents are now in aseptic condition and will remain so as long as germs or dust from the outside are not allowed to gain access. The moisture content of the chamber atmosphere may however not be at a desired point. This may be rectified by the use of the same tank and connections which served for the purpose of absorbing sulfur dioxid, these devices now being used, if necessary, to absorb excess moisture. To this end, the soda may be drawn off through 23 and sulfuric acid of any desired strength introduced through 24. If the acid is strong, it will act as a moisture absorbent. If it is weak and of a desired vapor tension, it will take up or give off moisture as the case may be until the atmosphere has the correct amount of moisture. After placing the sulfuric acid in the tank, pump 16 may be started and kept in action until a sample of the chamber atmosphere removed at 25 shows the desired moisture content.

During the storage of food in the chamber it is desirable that the pressure gage should show from 5 to 10 pounds pressure, the pressure varying somewhat according to the articles stored. Should the pressure run low at any time it is desirable to pump in nitrogen or carbonic acid through 9 until the pressure reaches the desired point. The gas introduced should be aseptic and free from bacteria.

Where storage is for a long time it may be desirable at times to test the sterility of the storage chamber. To this end beef bouillon or any other liquid customarily used as a culture medium for bacteria, yeast and the like, is placed in funnel 32 and air vented from receptacle 29 through 33 to allow such culture liquid to run into 29. By now introducing steam into 30 and boiling the bouillon for about an hour, it may be made thoroughly sterile. The vapors generated escape past a weighted valve 34. After the boiling, the culture medium is allowed to cool, the valve in 31 is opened to equalize pressures and the sterile liquid allowed to run through 35 past valve 36 into pan 27.

After a few days, or a week, samples of the contents of pan 27 are removed through 28 and examined for bacteria or other microorganisms. Should any be present, the antisepticizing and production of aseptic conditions should be repeated.

Other moisture absorbents or regulants, such as calcium chlorid or its solution may be used in the absorbent tank. While other antisepticizing agents than sulfur dioxid, such as formaldehyde, may be used, I regard sulfur dioxid as practically best adapted for the present purposes as it combines good sterilizing power with easy removability after the antisepticizing phase.

What I claim is:—

1. The process of preserving food which comprises exposing such food in a suitable chamber to the action of a volatile antiseptic until the food surfaces and chamber surfaces are sterile, then subjecting the atmosphere of the chamber to the action of an absorbent for such antiseptic until such atmosphere is substantially free of such antiseptic and maintaining the food under the aseptic conditions thus produced.

2. The process of preserving food which comprises exposing such food in a suitable chamber to the action of sulfur dioxid until the food surfaces and chamber surfaces are sterile, then subjecting the atmosphere of the chamber to the action of an absorbent of sulfur dioxid till such atmosphere is substantially free of sulfur dioxid and maintaining the food under the aseptic conditions thus produced.

3. The process of preserving food which comprises exposing such food in a suitable chamber to the action of sulfur dioxid under pressure until the food surfaces and chamber surfaces are sterile, then subjecting the atmosphere of the chamber to the action of an absorbent of sulfur dioxid till such atmosphere is substantially free of sulfur dioxid and maintaining the food under the aseptic conditions thus produced.

4. The process of preserving food which comprises exposing such food in a suitable chamber to the action of a gaseous mixture comprising nitrogen and sulfur dioxid, said mixture being under pressure, till the food surfaces and chamber surfaces are sterile, circulating the gaseous mixture past an absorbent for sulfur dioxid till a test for sulfur dioxid shows it to be absent and then maintaining the food under aseptic conditions in the residual nitrogen, said nitrogen being under pressure in excess of atmospheric pressure.

5. The process of preserving food which comprises placing such food in a container, replacing the oxygen of the atmosphere of such container by sulfur dioxid and placing such atmosphere under pressure, continuing the contact of the modified atmosphere with the food and interior chamber walls until antisepsis takes place, exposing the atmosphere to the action of an absorbent till a test no longer shows the presence of sulfur dioxid and maintaining the food under the aseptic conditions thus produced.

6. In the preservation of food, the process which comprises exposing the food to an atmosphere comprising sulfur dioxid till antisepsis is produced, removing the sulfur dioxid from such atmosphere, adjusting the moisture content of the residual atmosphere and maintaining the food in contact with the aseptic adjusted atmosphere thus produced.

7. In the preservation of eggs, the process which comprises assembling eggs in a suitable containing chamber, removing the oxygen from the atmosphere of such chamber and replacing it by sulfur dioxid, maintaining the dioxid-charged atmosphere in contact with the eggs and chamber till antisepsis is produced, removing the sulfur dioxid substantially completely from the atmosphere and maintaining the eggs under the aseptic conditions thus produced.

8. In the preservation of eggs, the process which comprises assembling eggs in a suitable containing chamber, removing the oxygen from the atmosphere of such chamber and replacing it by sulfur dioxid, maintaining the dioxid-charged atmosphere in contact with the eggs and chamber till antisepsis is produced, removing the sulfur dioxid substantially completely from the atmosphere, adjusting the moisture content of such atmosphere and maintaining the eggs under the aseptic conditions thus produced.

9. In a preserving apparatus, a hermetically closable chamber. means for supplying a volatile disinfectant thereto, means for circulating said disinfectant through the chamber and means for circulating the atmosphere of the chamber in a closed cycle past an absorbent for said disinfectant.

10. In a preserving apparatus, a hermetically closable chamber, means for circulating a disinfectant through the chamber, a chamber adapted to contain an absorbent material and means for circulating the atmosphere of the closable chamber through the absorbent chamber and back in closed cycle.

11. In a preserving apparatus, a hermetically closable chamber, a sulfur stove, means for circulating the atmosphere of said chamber in closed cycle through said chamber and stove, a chamber for containing an absorbent material, means for adding and removing absorbent materials to said chamber and means for circulating the atmosphere of the closable chamber in closed cycle through the absorbent chamber and back.

12. In an egg preserving apparatus, a chamber adapted to contain trays of eggs, a sulfur burner, means for circulating the atmosphere of said chamber through the sulfur burner in closed cycle, a tank for a liquid, means for adding liquid to and removing liquid from said tank and means for circulating the atmosphere of the chamber in a closed cycle through the tank and back.

In testimony whereof, I affix my signature in the presence of two subscribing witnesses.

ROY D. ELLIOTT.

Witnesses:
G. H. HOLDEN,
R. E. CHRISTIE.